United States Patent [19]

Bressler et al.

[11] Patent Number: 4,463,705
[45] Date of Patent: Aug. 7, 1984

[54] METHOD FOR TRAINING BREEDER HENS AND NEST INSTALLATION THEREFOR

[75] Inventors: Glenn O. Bressler, State College; James B. Godshalk, Yardley, both of Pa.

[73] Assignee: Ultra-Mold Corporation, Willow Grove, Pa.

[21] Appl. No.: 461,561

[22] Filed: Jan. 27, 1983

[51] Int. Cl.³ .............................................. A01K 31/14
[52] U.S. Cl. ..................................... 119/45 R; 119/48
[58] Field of Search ................... 119/48, 45 R, 49, 50, 119/47

[56] References Cited

U.S. PATENT DOCUMENTS

| | | | |
|---|---|---|---|
| 1,199,944 | 10/1916 | Tuttle | 119/48 |
| 2,694,381 | 11/1954 | Kaegebein | 119/48 |
| 2,833,246 | 5/1958 | Weber | 119/48 |
| 3,242,904 | 3/1966 | Rannou | 119/48 |
| 3,306,259 | 2/1967 | Willauer, Jr. | 119/48 |

Primary Examiner—Hugh R. Chamblee
Attorney, Agent, or Firm—Roylance, Abrams, Berdo & Goodman

[57] ABSTRACT

Method and apparatus by which large hens, such as broiler-breeders, can be trained to lay eggs in a roll-away nest, with the eggs being delivered automatically to a tray or collecting conveyor.

14 Claims, 14 Drawing Figures

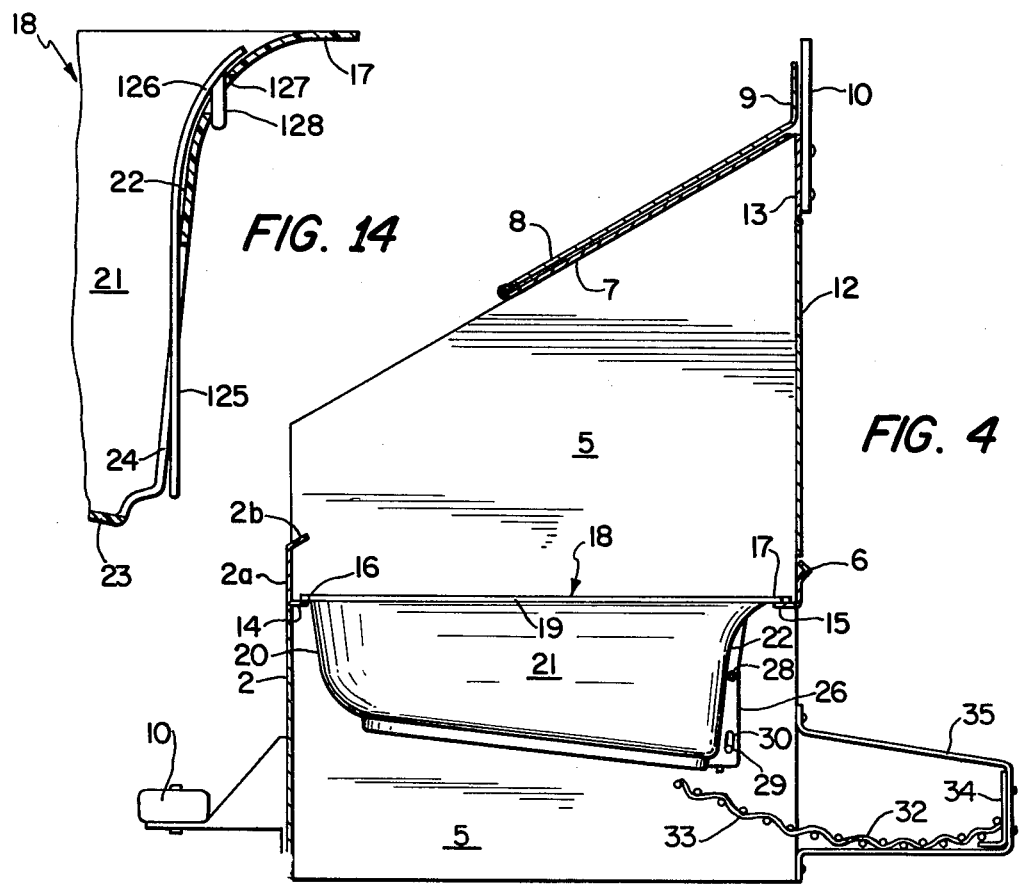
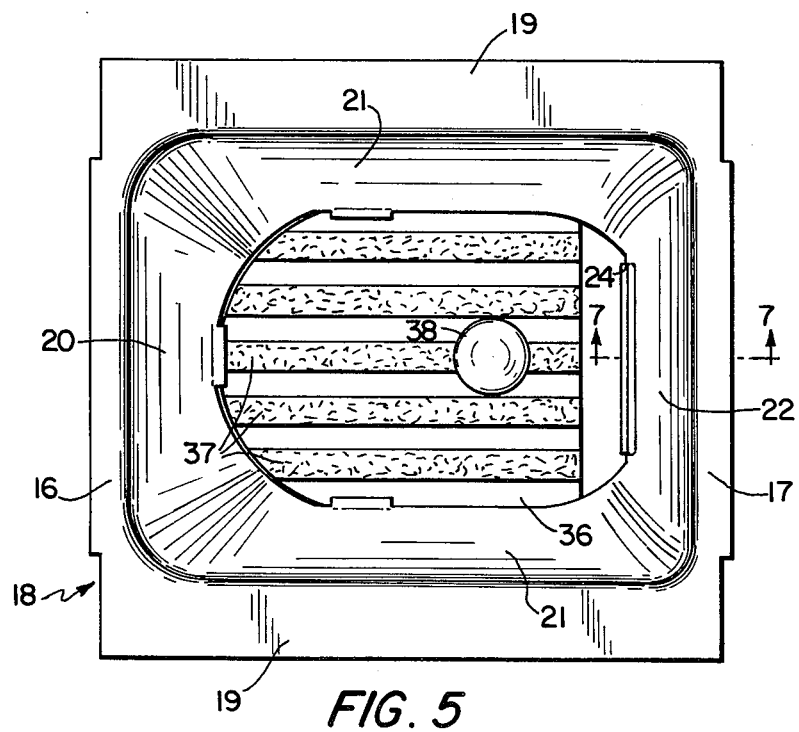

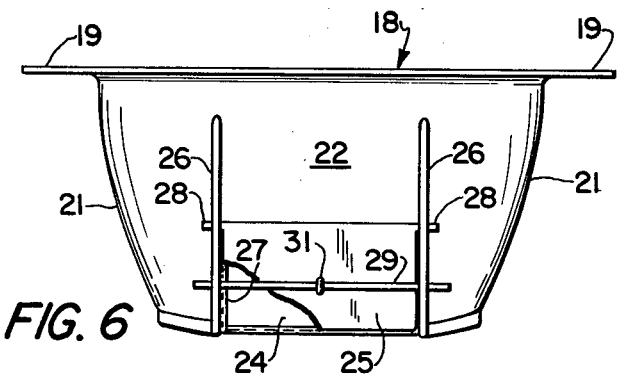
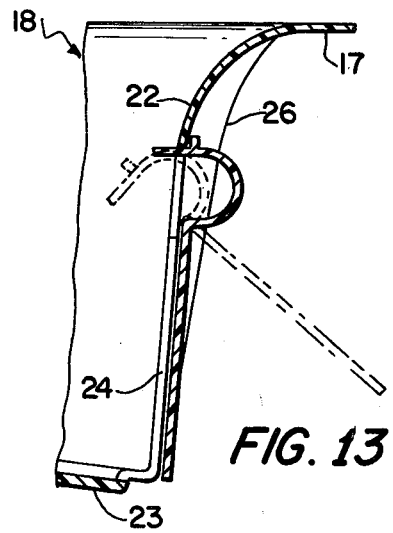
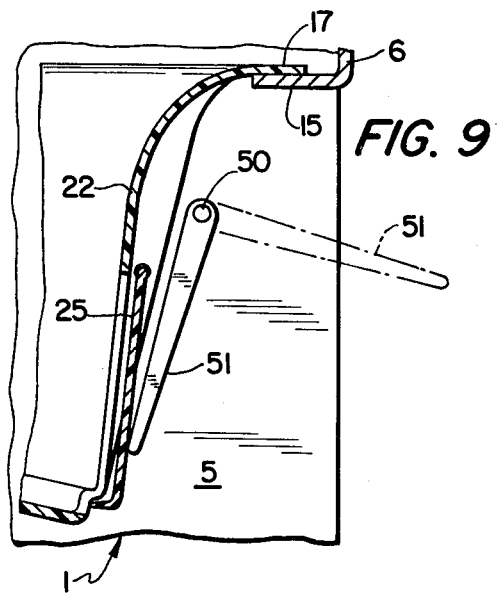
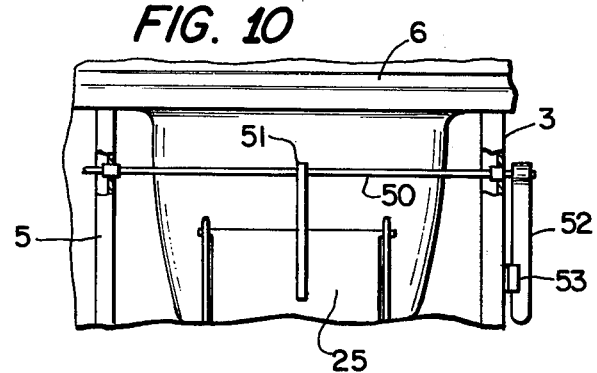
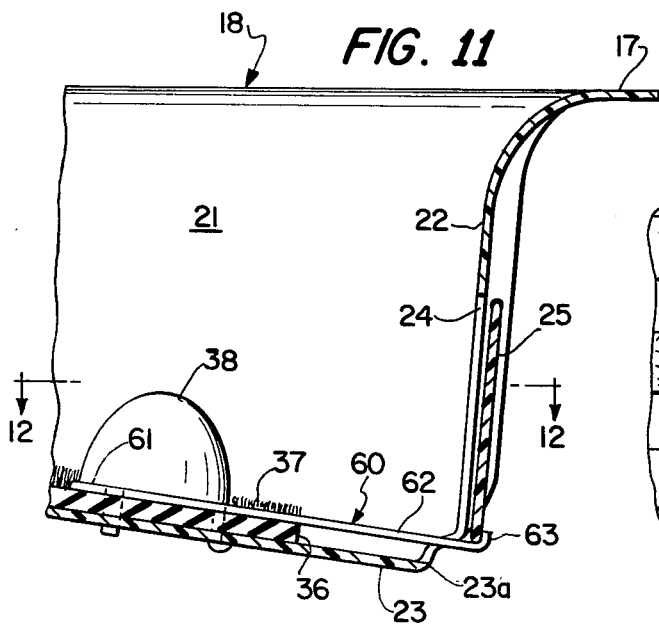
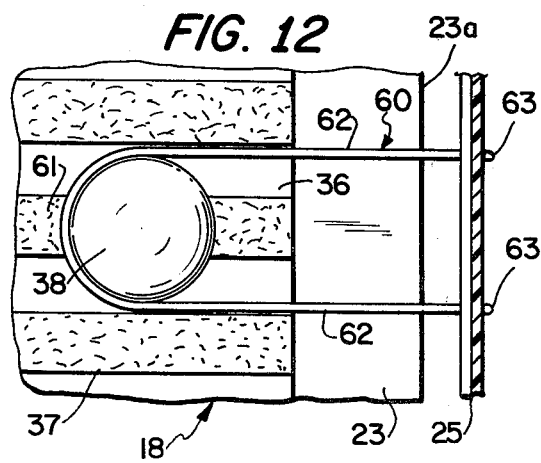

METHOD FOR TRAINING BREEDER HENS AND NEST INSTALLATION THEREFOR

This invention relates to large scale production of fertile chicken eggs and to a method and nest installation to be used in such production.

BACKGROUND OF THE INVENTION

Sterile chicken eggs, to be marketed for consumption as food, are usually produced by housing the hens in relatively small cages during the producing life of the birds. Fertile eggs, primarily used for raising broilers or meat birds but also used in some quantity by the drug industry for making vaccines, etc., must come from hens that have mated with roosters, and the birds must therefore have free space to live together as well as nests available to the hens for laying eggs. Heretofore, a usual practice has been to provide nest housings located within a chicken house having a substantial free floor space, and to provide wood shavings or other litter both on the free floor space of the house and in the nest housings. When litter is employed in the nest housings, the purpose is to make the nest more attractive to the hen, and to that extent this practice has been successful. However, this practice has several disadvantages. First, with litter employed in a conventional nest, it is necessary to collect the eggs from the nest by hand, since the litter tends to prevent eggs from passing through the exit openings of the usual roll-away nests. Next, with conventional nests, a nest in which litter is provided is sometimes not enough more attractive to the hen than is the litter on the free floor space of the house, and the hens tend to lay an excessive number of eggs on the floor of the house. So-called "floor eggs" are lost, and economics demands that floor eggs be held to, e.g., not more than 5% of the total eggs laid. Also, the tendency for hens to lay eggs on the floor of the chicken house is accentuated because it is desirable to have large hens, typically the "boiler-breeders" which have a weight of 8-9 pounds, and the large hens tend to avoid the effort necessary to gain access to the nest housing. A further problem is that, with conventional nest and nest floor materials, which have been used in roll-away nest housings, and especially with the use of litter on such materials, excessive labor costs are encountered in attempting to keep the nests clean. Some success has been achieved in using roll-away nests for the production of fertile eggs, mainly for the drug industry, when small birds have been used, leghorns being typical. However, no truly successful way has heretofore been found to induce the larger hens, and particularly the broiler-breeders, to use the roll-away nests, and there has been a continuing need for improvement.

OBJECTS OF THE INVENTION

A first object of the invention is to devise a method for training larger hens, such as broiler-breeders, to lay eggs only in the nests provided, and to provide a nest assembly for carrying out that method.

Another object is to provide a roll-away nest assembly which can be successfully used in the commercial production of fertile eggs from large hens.

A further object is to reduce the number of floor eggs occurring in the commercial production of fertile eggs.

SUMMARY OF THE INVENTION

Practice of method embodiments of the invention requires a conventional chicken house having free floor space, and a nest housing containing a plurality of nests disposed in a single tier near floor level, the housing having for each nest an access way which is relatively large in comparison to the size of a hen to be trained and which opens both forwardly and upwardly, each nest comprising a nest shell conforming generally in plan elevation to the shape of a nesting hen and having a floor which slants downwardly to an exit opening in a wall of the shell and through which eggs may roll to be collected. Litter, which can be wood shavings, is distributed over the free floor space of the chicken house and over the floors of the nest shells. Closure means is then secured across the exit openings of the nest shells, and the young breeder hens to be trained are confined in the chicken house for a maturing and training period. During the maturing and training period, typically from two to a few weeks, the small eggs laid by the immature hens are collected from the nests by hand, the litter remaining in the nest shells and being replenished or replaced as necessary. At the end of the training period, with the hens now mature, the next step is to release the closure means and remove the litter from the nest shells either manually or by allowing the hens to scratch the litter out via the exit openings. The hens are then confined in the chicken house with roosters for production of fertile eggs which are laid in the nest shells and delivered automatically via the exit openings for collection.

In apparatus embodiments, the nest housing has end walls and a plurality of spaced upright partitions defining nest compartments, each compartment being equipped with a nest shell support. For each compartment, upper and frontal edges of the corresponding pair of partitions, or partition and end wall, define the upwardly and forwardly opening access way via which the hen can reach the nest shell from the floor of the chicken house without undue effort. The nest shells each define an open-top nesting cavity having side walls, a front wall, a rear wall and a floor which slants downwardly and rearwardly from the front wall, the rear wall having an exit opening of such size and shape as to allow free passage of an egg rolling down the floor. The closure means for the exit openings are advantageously in the form of individual doors, one associated with each exit opening. The doors or other closure means can be pivoted directly on the nest shells, so as to swing open under the influence of the rolling egg or under the influence of litter or debris being scratched from the nest shell, or the doors can be fixed to the nest shell in releasable fashion and simply removed at the end of the maturing and training period. When the door is pivoted on the nest shell, any of several releasable securing devices can be employed. Success of the method arises because the hens become familiar with the nests, and develop the habit of laying eggs in the nest shells, during the maturing and training period. To minimize the differences which will be observed by the hens when the litter has been removed from the nest shells, it is particularly advantageous to cover the floors of the nest shells with a mat which is not only resilient to reduce the danger of egg breakage, but also presents pile surface areas which are suggestive to the birds of litter.

IDENTIFICATION OF THE DRAWINGS

FIG. 4 is a transverse cross-sectional view taken generally on line 4—4, FIG. 1;

FIGS. 5 and 6 are top plan and rear elevational views, respectively, of a nest shell employed in the nest housing of FIGS. 1-4;

FIG. 9 is a fragmentary sectional view similar to FIG. 7 but illustrating another form of locking device for the nest shell;

FIG. 10 is a fragmentary rear elevational view showing the manner in which the locking device of FIG. 9 is mounted on a nest housing;

FIG. 11 is a fragmentary sectional view similar to FIG. 7 but illustrating a further embodiment;

FIG. 12 is a view, partly in top plan elevation and partly in cross section, taken generally on line 12—12, FIG. 11;

FIG. 13 is a fragmentary sectional view similar to FIG. 7 and showing still another embodiment; and FIG. 14 is a fragmentary sectional view similar to FIG. 7 and illustrating a removable closure member applied to the nest shell.

DETAILED DESCRIPTION OF THE INVENTION

For clarity, one embodiment of nest installations useful in carrying out the method will first be described.

Nest Housing and Nest Shells of FIGS. 1-8

The nest housing indicated generally at 1 is typical of those which may be used in practicing the method and is of the type which can be fabricated conventionally from sheet metal. The housing comprises a front wall comprising members 2 and 2a, end wall members 3 and 4, upright partitions 5 and a rear structural bar 6. End wall members 3, 4 and partitions 5 are flat sheet metal pieces of identical shape and flanged along all edges. The bottom edge of each end wall and partition is straight and horizontal, the front and rear edges are straight and vertical with the front edge substantially shorter than the rear edge, and the top edges slant downwardly and forwardly at, e.g., 30° to join the upper ends of the rear and front edges, as will be clear from FIGS. 3 and 4. The front wall and bar 6 are secured to the respective flanged edges of the end walls and partitions, as by sheet metal screws, with the partitions being equally spaced lengthwise of the housing to divide the interior of the housing into five compartments A-E.

Figure 1:
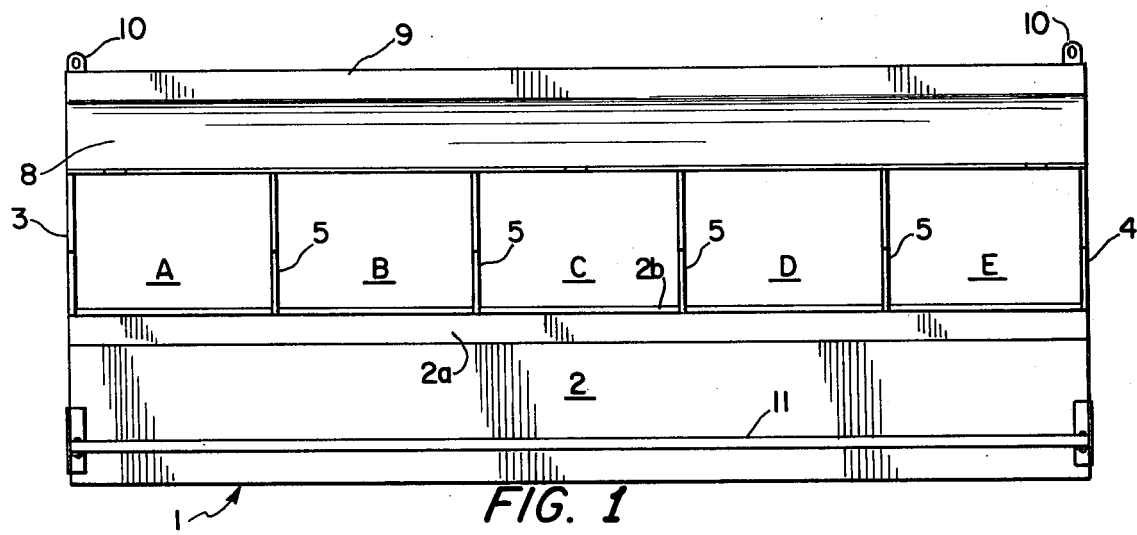
FIG. 1 is a front elevational view of a nest housing according to one apparatus embodiment of the invention.
Figure 3:
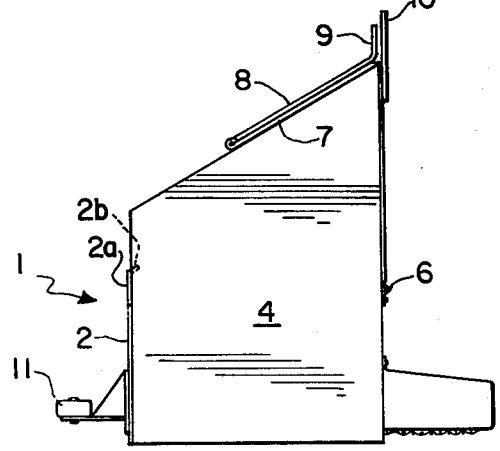
FIG. 3 is an end elevational view of the nest housing.

The rear half of the top of the housing is closed by member 7, FIGS. 3 and 4, to the front edge of which is pivoted in conventional fashion a top door 8 which can be pivoted between the open position, seen in FIGS. 1, 3 and 4, and a closed position, in which flange 9 overlaps the upper portion of front wall member 2. With door 8 open, the compartments are accessible from the top and front of the housing. Thus, the front wall and the upper portions of the partitions and end walls combine to define accessways via which hens can enter the respective compartments. In a typical installation, front wall 2 can be 8 in. high so that, with the housing disposed on or adjacent the floor of the chicken house, the upwardly and forwardly opening tops of compartments A-E are easily accessible even to large hens. Since, in some installations, one end of the housing rests on a slatted portion of the chicken house floor which is elevated relative to the main or clear space of the floor while the other end of the housing is suspended, as via one of the suspension lugs 10 and is therefore spaced somewhat above the chicken house floor, a perch bar 11 is provided, as shown. Only above bar 6, the rear of the housing is closed by a door 12 which extends across all of the compartments and is pivoted to the lower edge of a narrow strip 13 fixed rigidly to the tops of the rear edges of the end walls and partitions. Each compartment A-E opens rearwardly in the entire space below bar 6.

Save for a bottom flange, front wall member 2 is a flat sheet metal piece extending from end wall to end wall and secured in any suitable fashion to the front flanges of the end walls and partitions. Front wall member 2a is a relatively narrow sheet metal strip which also extends over the entire length of the housing 1 and is secured directly to the front flanges of the end walls and partitions. The bottom edge portion of member 2a is provided with inwardly projecting horizontal flanges 14, each flange extending only between the corresponding adjacent pair of partitions or partition and end wall. Along its upper edge, member 2a is provided with inwardly and upwardly projecting flange portions 2b which slant upwardly and rearwardly between each adjacent pair of partitions or partition and end wall.

The bottom edge portion of bar 6 is provided with horizontal flanges 15 which project forwardly into the respective compartments. All of flanges 14, 15 lie in a common horizontal plane. For each compartment A-E, flanges 14, 15 are engaged respectively beneath the front and rear flanges 16, 17 of a nest shell indicated generally at 18. Flanges 16, 17 are portions of an integral shell body advantageously formed of polymeric material, as by injection molding. Any suitable polymeric material which is substantially rigid and self-sustaining at ambient temperatures can be employed. Shell 18 includes opposed side flanges 19, the plan dimensions of the shell being such that the outer edges of the side flanges are spaced apart by a distance only slightly less than the width of the respective compartment so that, when the shell is placed in the compartment with flanges 16, 17 resting respectively on flanges 14 and 15, shell 18 substantially completely closes the compartment at the level of the front, side and rear flanges.

Top door 8 is closed at night to prevent hens from roosting in the housing and soiling the nests. In this connection, it is to be noted that, above the upper edge of member 2a, compartments A-E open forwardly, even when door 8 is closed, since there is a significant space between member 2a and the lower edge of flange 9 when door 8 is closed. Thus, any hen trapped within the nest housing when door 8 is closed can raise door 8 enough to climb out of the nest but, with the door closed, birds outside the nest housing cannot gain entry to the housing. With door 8 open, upper flanges 2b of member 2a serve as intermediate perches for birds entering compartments A-E.

The nest shell includes front, side and rear wall portions 20, 21 and 22, respectively, and a floor 23. The front, side and rear wall portions slant generally inwardly, and the floor slants downwardly from the front wall portion to the rear wall portion. The front, side and rear wall portions combine with the floor to define an upwardly opening cavity which, in top plan elevation, corresponds generally in shape to a nesting hen and is of such size as to accommodate a large hen, e.g., a broiler-breeder in the 8-9 lb. range.

Figure 7:
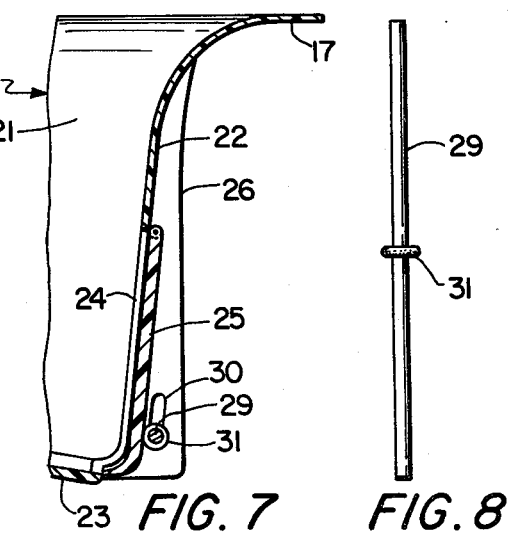
FIG. 7 is a fragmentary cross-sectional view taken generally on line 7—7, FIG. 5.

Rear wall portion 22 is provided with a doorway 24, FIGS. 5-7, forming an exit opening for eggs rolling down floor 23. In this embodiment, opening 24 can be closed by a door 25. Rear wall portion 22 is formed with two flanges 26 which project outwardly from the wall portion, are mutually parallel and at right angles to the common plane of flanges 16, 17 and 19, and are spaced apart so that each flange 26 immediately adjacent to a different one of the sides of opening 24, there being only a small strip 27, FIG. 6, of rear wall portion 22 between each flange 26 and the adjacent side edge of opening 24. Door 25 is formed as an integral piece from rigid polymeric material and includes two mutually coaxial pintles 28 which are integral with the door at the top edge thereof and are bearinged in openings in the respective flanges 26. When unrestrained, door 25 swings easily outwardly and upwardly, allowing eggs rolling down floor 23 to escape via opening 24.

Figure 8:
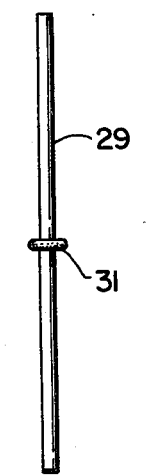
FIG. 8 is a side elevational view of a locking bar employed with the nest shell of FIGS. 5-7.

Door 25 can be releasably secured by locking shaft 29 which is engaged through aligned slots 30 in flanges 26. As seen in FIG. 8, a compressible ring 31, typically an elastomeric O-ring, is slipped onto shaft 29 and positioned at the midpoint thereof, the radial thickness of the ring, when stretched over the shaft, being larger than the space between the shaft and the door when the door is closed. Thus, when in place, the combination of the shaft 29 and ring 31 serves to releasably secure the door in its closed position, the resiliency of the ring urging the door against portions 27 of the rear wall. However, when it is desired to free the door to swing for release of eggs via opening 24, shaft 29 is simply removed by hand.

Figure 2:
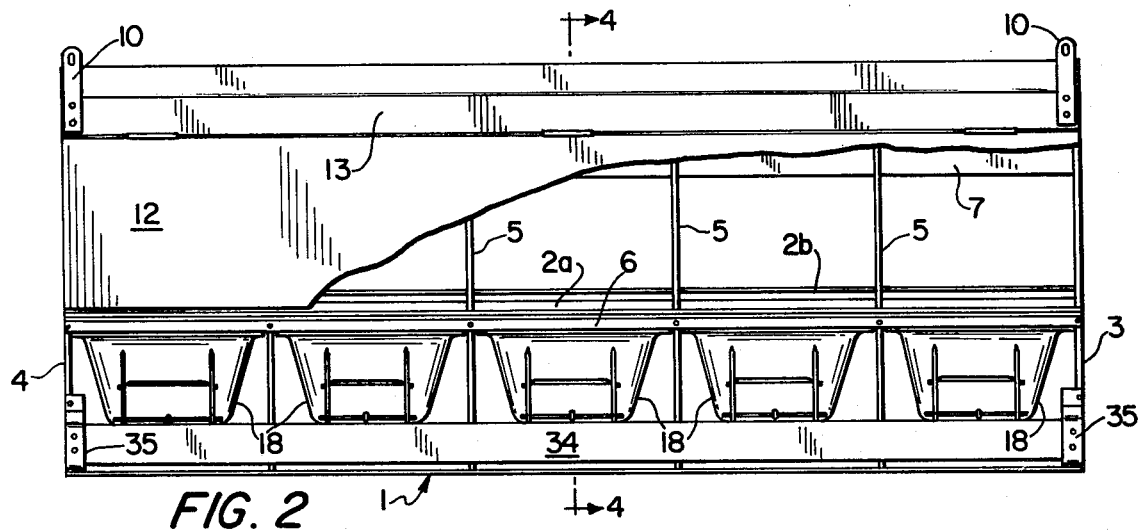
FIG. 2 is a rear elevational view of the nest housing of FIG. 1.

As seen in FIG. 2, a nest shell 18 is disposed in each of the compartments A-E, and the positions of the nest shells determined by the coacting flanges is such that the egg exit opening 24 of each shell 18 opens to the space between bar 6 and the bottom of the housing, all of the openings 24 being disposed with their lower edges in a common horizontal plane. In this embodiment, a conventional egg tray 32 and chute 33, FIG. 4, are provided to receive eggs delivered via openings 24 of nest shells 18. Formed of suitably coated wire mesh, tray 32 extends for the full length of housing 1, being supported conventionally by bar 34 and end brackets 35 as well as by being joined to the egg chutes 33. Egg chutes 33 are each disposed beneath a different one of the egg exit openings 24 and can be supported on the housing structure in any suitable fashion. Egg tray 32 can include an egg collecting belt, if desired.

As best seen in FIG. 7, floor 23 of shell 18 is spaced slightly below the lower edges of the side wall portions to provide a recess to accommodate an elastomeric mat 36, FIG. 5. The upper surface of mat 36 is provided with a plurality of strips 37 in the nature of pile material, the strips extending from front wall portion 20 to rear wall portion 22, being mutually parallel and spaced apart equally laterally. Advantageously, strips 37 are provided by first coacting the corresponding portions of the upper face of mat 36 with adhesive, then applying short polymeric fibers to the adhesive by conventional electrostatic flocking so that the fibers are not only secured to the mat but also oriented so as to project upwardly from the mat. A decoy egg 38 is secured to the bottom wall in any conventional fashion.

Practicing the Method with the Apparatus of FIGS. 1-8

In practicing the method of the invention, nest housing 1 is installed in a chicken house having substantial floor space in comparison to the size of the housing, installation being such that perch bar 11 and the open upper portions of compartments A-E are near the floor of the house. In some houses, housing 1 can be placed directly on the floor of the chicken house. In others, one end portion of the housing can rest on a slatted portion of the floor somewhat above the main floor level, and the other end of the housing can be suspended using one of lugs 10.

Five of the identical nest shells 18 are selected and door 25 of each nest shell is secured in closed position by installing shaft 29. The nest shells are then installed in nest housing 1, with front flange 16 engaged over flange 14 and rear flange 17 resting on flange 15.

Litter is then distributed over a substantial area of free floor space in the chicken house. Litter is also placed in each nest shell to provide, e.g., an initial litter depth of at least 1 inch and up to 4 inches, the litter being retained against escape via egg exit openings 24 because doors 25 are secured closed.

The hens to be trained are then confined within the chicken house for a maturing and training period of 2-6 weeks. During this period, the hens will lay eggs in the nest shells 18, being attracted to the nest shells by the litter therein because the litter renders the nest shells not unlike the littered floor on which the hens spend most of their time. The hens are also attracted to the nest shells because, since compartments A-E open both forwardly and upwardly, the tops of the compartments can be reached by the hens with little effort. In this connection it will be noted that, while each adjacent pair of partitions 5, or the combination of each end wall 3, 4 and the adjacent partition 5, combine to direct the hen to the nest shell 18, the top of the nest shell is only a short distance below the upper edge of front wall member 2a, and it is unnecessary for the hen to descend far into the nest housing to reach the nest shell, nor is it necessary for the hen to climb up any significant distance in order to leave the nest.

The eggs laid during the early portion of the maturing and training period are relatively small and must be collected from the nest shells by hand, doors 25 remaining closed. During egg collection in this period, the nest shells are checked for cleanliness and to assure that they contain adequate litter, and litter is replenished as required or replaced if necessary during cleaning.

At the end of the maturing and training period, the litter is removed from the nest shells and all of the locking shafts 29 are removed so that doors 25 are free to swing out of the way to allow passage through openings 24 of eggs rolling down floors 23. Alternatively, locking shafts 29 can be removed and the hens allowed to scratch the litter out of the nest shell via openings 24. In either case, the hens now enter the nest shells to find mats 36 completely exposed, with the pile or flocked strips 37 presented to give the hens some feel similar to that of litter. With doors 25 now free to open, all eggs laid in the nest shells roll freely down floors 23, out through openings 24 and down chutes 33 to come to rest on collecting tray 32 or, if one is employed, on the off-bearing egg conveyor.

Door Locking Device of FIGS. 9 and 10

In this embodiment, the nest housing, the nest shells and the doors for the egg exit openings of the nest shells are identical to the corresponding elements in the embodiment of FIGS. 1–8, and the same reference characters employed in FIGS. 1–8 are used in FIGS. 9 and 10 for identical elements. In this embodiment, a horizontal locking shaft 50 extends for the full length of nest housing 1, being journalled in any conventional fashion in end walls 3, 4 and partitions 5 so that the shaft is free to rotate. As seen by comparing FIGS. 9 and 10, shaft 50 is within the nest housing, located below bar 6, behind rear wall portions 22 of nest shells 18, and above and behind the pivoted upper edges of doors 25. At points each centered relative to egg exit opening 24 of a different one of the nest shells, shaft 50 is equipped with five door-locking levers 51, each lever being rigidly secured at one end to shaft 50 and being of such length as to be capable of engaging a lower portion of the corresponding door 25. All of levers 51 lie in a common plane which includes the longitudinal axis of the shaft. One end portion of shaft 50 projects beyond end wall 3, as seen in FIG. 10, and an actuating handle 52 is rigidly fixed to that end portion. A spring metal detent strip 53 is secured to the outer face of end wall 3 and presents two outwardly opening detent notches capable of accepting and retaining an edge portion of handle 52 in a location spaced from the axis of rotation of shaft 50. The two detent notches are spaced apart circumferentially with respect to the axis of rotation by an arcuate distance such that member 53 can secure handle 52, and therefore shaft 50, selectively in two rotational positions. In the first such position, all of the levers 51 are disposed in the inactive position shown by broken lines in FIG. 9. In the second position, levers 51 are held in the active position shown in solid lines in FIG. 9. Thus, so long as handle 52 is engaged in the first detent notch, all of the levers 51 are maintained in their raised inactive positions and all of the pivoted doors 25 are free to swing open under the influence of eggs rolling down the slanted floors of nest shells 18 and through exit openings 24. When handle 52 is manually disengaged from the first detent notch and swung into engagement with the second notch, all of levers 51 are swung downwardly and forwardly into engagement with the doors and handle 52 is then retained by the second detent notch so that all of levers 51 are retained in door-locking position, as seen in FIG. 9.

Door Locking Device of FIGS. 11 and 12

Again using the same reference characters as in FIGS. 1–8 when elements remain unchanged, FIGS. 11 and 12 disclose a releasable door locking means which coacts with the decoy egg of the nest tray and can be released by a person standing in front of the nest housing. Here, a separate door locking device is provided for each nest shell and consists of a wire member 60 having a portion 61 bent through 180° to embrace the base of decoy egg 38. Member 60 includes two straight arm portions 62 of such length as to extend beneath door 25 when portion 61 is engaged about the decoy egg. At its free end, each arm portion 62 is bent at right angles to provide a door-engaging portion 63, the two portions 63 projecting in the same direction. With portion 61 held in the hand, the locking device is installed by inserting the device downwardly and rearwardly through exit opening 24 until portions 63 are behind the lower edge portion of door 25, then pivoting the device downwardly and forwardly until portion 61 engages around the front of decoy egg 38 and arm portions 62 extend along the upper surface of mat 36 and along adjacent edges of the respective strips 37, as shown in FIG. 12. When so installed, the locking device is in light tension between the decoy egg and the lower edge portion of the door, holding the door in its closed position. For removal of the locking device, one simply reaches into the nest shell, grasps portion 61 and swings member 60 upwardly and rearwardly until portions 63 swing downwardly and forwardly free of door 25. In this connection, it is to be noted that the rear edge portion 23a of bottom wall 23 of the nest shell is, as in the embodiments earlier described, spaced forwardly throughout the width of exit opening 24, allowing free movement of the ends of arm portions 62 and hook portions 63 as member 60 is manipulated.

Combined Door and Locking Device of FIG. 13

Again using the same reference characters as in FIGS. 1–8 when elements remain unchanged, FIG. 13 illustrates a combined door and door locking device for nest shell 18. As in the embodiments earlier described, door 25 is pivoted on flanges 26 to swing about a horizontal axis parallel to and near the upper edge of exit opening 24. In this embodiment, the upper edge of the egg exit opening is interrupted by a relatively narrow notch 24a in rear wall portion 22, notch 24a having straight side walls and opening downwardly into exit opening 24. Door 25, again in the form of a flat piece of rigid polymeric material, is provided with a spring lock member 25a which is integral with the body of the door, projects generally upwardly from the upper edge of the door, and is so positioned on the door that, with the door in place as shown, lock member 25a is aligned with notch 24a. Viewed from a side edge of the door, member 25a includes a portion 25b which extends circularly through 180° first rearwardly from the upper edge of the door, then forwardly. Member 25a also includes a tip portion 25c which is straight and projects forwardly through notch 24a when the door is in the closed position shown in solid lines in FIG. 13. A stop lug 25d, formed integrally with member 25a, projects away from the junction between portions 25b and 25c, lying generally in the plane of the door. Viewed from the rear of the door, all portions of member 25a have straight side edges spaced apart by a distance slightly less than the space between the side walls of notch 24a, so that member 25a can pass through notch 24a, save as such movement relative to rear wall portion 22 is limited by stop lug 25d. The polymeric material from which door 25 and member 25a are formed as an integral piece, while rigid in the sense that that term is used in the plastics art, is also resilient, capable of being elastically deformed when the piece is of the relatively small thickness illustrated. The radius of curvature of portion 25b, the location of the pivotal axis at the top of the door, and the height of notch 24a are such that, when the door has been pivotally mounted on flanges 26, tip 25c projects forwardly through notch 24a and is held in light sliding engagement with upper edge 24b of the notch, as shown in solid lines in FIG. 13. Stop lug 25d therefore comes into engagement with the outer face of wall portion 22 of the nest shell whenever the door is subjected to any significant force tending to swing the door open, that is, to swing the door rearwardly. So long as the parts remain as shown in solid lines in FIG. 13, the door is thus held closed by engagement of the stop lug with wall portion 22. When it is desired to free the door to swing open, force is first applied downwardly on member 25a to resiliently distort portion 25b until stop lug 25d is free to pass forwardly beyond notch edge 24b, and member 25a is then moved forwardly through notch 24a until stop lug 25d is in front of notch edge 24b. As will be clear from the broken line illustration of the door and member 25a, the door is now free to swing rearwardly and upwardly, under the influence of eggs rolling through opening 24, so long as member 25a is not again deformed and manipulated to bring stop lug 25d behind notch edge 24b.

The Embodiment of FIG. 14

While the doors of the earlier-described embodiments advantageously are wider than the egg exit opening, so that the lateral edges of the door can engage the rear wall portion of the nest shell when the door closes, this embodiment comprises a door 125 which is only slightly narrower than the egg exit opening, so that the main portion of the door can be passed through that opening. Thus, the main body portion of door 125, FIG. 14, can be passed downwardly through egg exit opening 24 to effectively close that opening. In this embodiment, the door includes an upwardly projecting extension 126 which is curved to confirm to the inner surface presented by that portion of rear wall portion 22 of the nest shell above opening 24 so that, when the main body of the door is inserted downwardly through opening 24, portion 126 comes into substantially flush engagement with rear wall portion 22, as shown. Rear wall portion 22 is provided with an opening 127. Portion 126 of the door has an integrally formed dependent tongue 128 dimensioned to pass downwardly through opening 127. Accordingly, when the door is inserted downwardly through exit opening 24, tongue 128 passes through opening 127. Since opening 127 is a substantial distance above the upper edge of opening 24, any force tending to open the door, i.e., to displace the door rearwardly relative to wall portion 22 of the nest shell, is opposed by engagement of tongue 128 in opening 127 and by engagement of portion 126 with the underlying portion of wall 22. Thus, once inserted as shown, the door is effective to close exit opening 24 against escape of both litter and eggs. When it is desired to clear opening 24, door 125 is simply withdrawn upwardly and removed.

It will be apparent that all of the apparatus embodiments described can be used in practicing the method of the invention.

What is claimed is:

1. The method for training breeder hens to lay eggs in a roll-away nest, comprising
   providing in a chicken house which has free floor space a nest installation comprising
      a nest housing containing a plurality of nests disposed in a single tier near floor level, the housing having for each nest an access way which is relatively large in comparison to the size of a hen to be trained and which opens both forwardly and upwardly,
      each nest comprising a nest shell conforming generally in plan elevation to the shape of a nesting hen and having a floor which slants downwardly to an exit opening through which eggs may roll to be collected;
   placing litter on the floor of the chicken house and in the shells of the nests;
   securing closure means across the exit openings of the nest shells to prevent escape from the nest shell of the litter therein and any eggs laid upon the litter;
   confining young breeder hens in the chicken house for a maturing and training period;
   collecting from each nest shell by hand the eggs laid therein during the maturing and training period;
   then releasing the closure means and effecting removal of the litter from the nest shells; and
   then confining the hens in the chicken house with roosters for production of fertile eggs to be laid in the nest shell and delivered via the exit openings for collection.

2. The method according to claim 1, wherein
   the nests are equipped with pivoted doors arranged to swing between a first position, closing the exit opening, and a second position allowing eggs to roll through the opening;
   the step of securing the closure means is carried out by locking the doors in said first position; and
   the step of releasing the closure means is carried out by unlocking the doors.

3. The method according to claim 1, wherein
   the step of securing the closure means is carried out by placing a closure across the exit opening and securing the closure; and
   the step of releasing the closure means is carried out by removing the closures.

4. In a nest installation to be used in a chicken house of the type having substantial free floor space to be covered with litter, the combination of
   a nest housing having end walls and a plurality of spaced upright partitions defining a plurality of nest compartments arranged side-by-side and each provided with a nest shell support,
      said supports being arranged in a single tier which is near the floor of the chicken house when the housing is in place,
      the housing defining for each compartment an access way opening both upwardly and forwardly via which a hen can enter the compartment and reach the space above the nest shell support of the compartment;
   a plurality of nest shells each defining an open-top nesting cavity conforming generally in plan elevation to the shape of a nesting hen, each shell comprising
      side walls,
      a front wall,
      a rear wall,
      a floor which slants downwardly and rearwardly from the front wall, and
      means for engaging the nest shell support of the compartment to support the nest shell in the compartment,
      the rear wall having an exit opening of such size and shape as to allow free passage of an egg rolling down the floor;
   closure means for said exit openings comprising a plurality of doors each movably mounted on a different one of the nest shells; and
   releasable means for securing the respective doors each across the exit opening of the corresponding nest shell to prevent escape from the nest shell of litter and eggs.

5. A nest installation according to claim 4 and further comprising
a plurality of cushioning mats each overlying the floor of a different one of the nest shells, each of said mats comprising
a planar sheet of resilient material disposed on the floor of the nest shell, and
a plurality of mutually parallel strips each made up of upwardly projecting fibers secured to the sheet of resilient material, said strips being spaced apart laterally to expose the resilient material, the lengths of the strips extending from the front wall of the nest shell toward the rear wall.

6. A nest installation according to claim 4, wherein
the doors are each pivotally mounted on the respective nest shell,
the pivotal axis for each door being adjacent the top of the door so that the door depends from the pivotal axis toward the bottom of the exit opening;
the rear wall portion of the nest shell is provided with a notch which opens downwardly into the exit opening; and
said releasable means comprises a resilient locking member carried by and projecting upwardly from the door in a location aligned with said notch when the door is in place, the locking member comprising a stop lug which projects upwardly and is opposed to an outer portion of the rear wall portion of the nest shell above the notch when the door is closed, the locking member being resiliently distortable to allow the stop lug to pass through the notch, whereupon the door is free to swing rearwardly and upwardly to open the exit opening.

7. A nest installation according to claim 4, wherein
each door is capable of occupying a position on the corresponding nest shell to close the exit opening thereof and being completely removable from the nest shell when the exit opening is to be opened; and
the releasable means comprising for each door a member carried by the door and constructed and arranged to coact with a portion of the respective nest shell to secure the door in position to close the exit opening of that nest shell.

8. A nest installation according to claim 7, wherein
the rear wall of each nest shell curves upwardly and rearwardly above the exit opening;
the door includes a main body dimensioned to be inserted downwardly into the exit opening to effectively close the exit opening;
the rear wall portion of the nest shell includes a retaining opening spaced above the exit opening;
the door includes an upper extension which is curved to conform to the upward and rearward curvature of the rear wall of the nest shell,
downward insertion of the door causing said upper extension to come at least into close proximity to the upwardly and rearwardly curving rear wall of the nest shell,
the upper extension of the door including a dependent tongue disposed to engage in said retaining opening as the door is inserted downwardly.

9. A nest installation according to claim 4, wherein
the doors are each pivotally mounted on the respective nest shell,
the pivotal axis for the door being adjacent the top of the door so that the door depends from the pivotal axis toward the bottom of the exit opening; and
said releasable means engages the outer face of the door in a location spaced below the pivotal axis when the door is secured by the releasable means.

10. A nest installation according to claim 9, the combination further comprising
a decoy egg secured to the floor of the nest shell;
the releasable means comprises a member having a first portion which embraces the frontal portion of the decoy egg, extends from the decoy egg rearwardly beneath the door, and includes a portion engaging the rear face of the door.

11. A nest installation according to claim 9, wherein
the rear wall of each of the nest shells has two upright flanges located each on a different side of the exit opening and projecting rearwardly; and
said releasable means for each nest shell comprises a shaft insertable through and removable from openings in the flanges.

12. A nest installation according to claim 11, wherein
the openings in the flanges are spaced rearwardly from the rear face of the door, when the door is in closed position, by a distance larger than half the transverse dimension of the shaft, the releasable means further comprising
a resiliently compressible ring embracing on intermediate portion of the shaft and, when relaxed and undistorted, extending radially from the shaft by a distance larger than the spacing between the door and the openings in the flanges.

13. A nest installation according to claim 9, wherein
said releasable means comprises
a shaft rotatably mounted on the nest housing and extending adjacent and spaced rearwardly from the locations occupied by the rear walls of the nest shells; and
a plurality of locking arms projecting laterally from said shaft,
the position of said shaft and the lengths of the locking arms being such that the shaft can be rotated between a first position, in which the locking arms are spaced away from the respective doors to allow the doors to swing open, and a second position, in which the locking arms engage the doors to secure the doors in closed position.

14. A nest installation according to claim 13, the combination further comprising
means for selectively retaining said shaft in said first and second positions.

* * * * *